United States Patent Office
2,982,965
Patented May 9, 1961

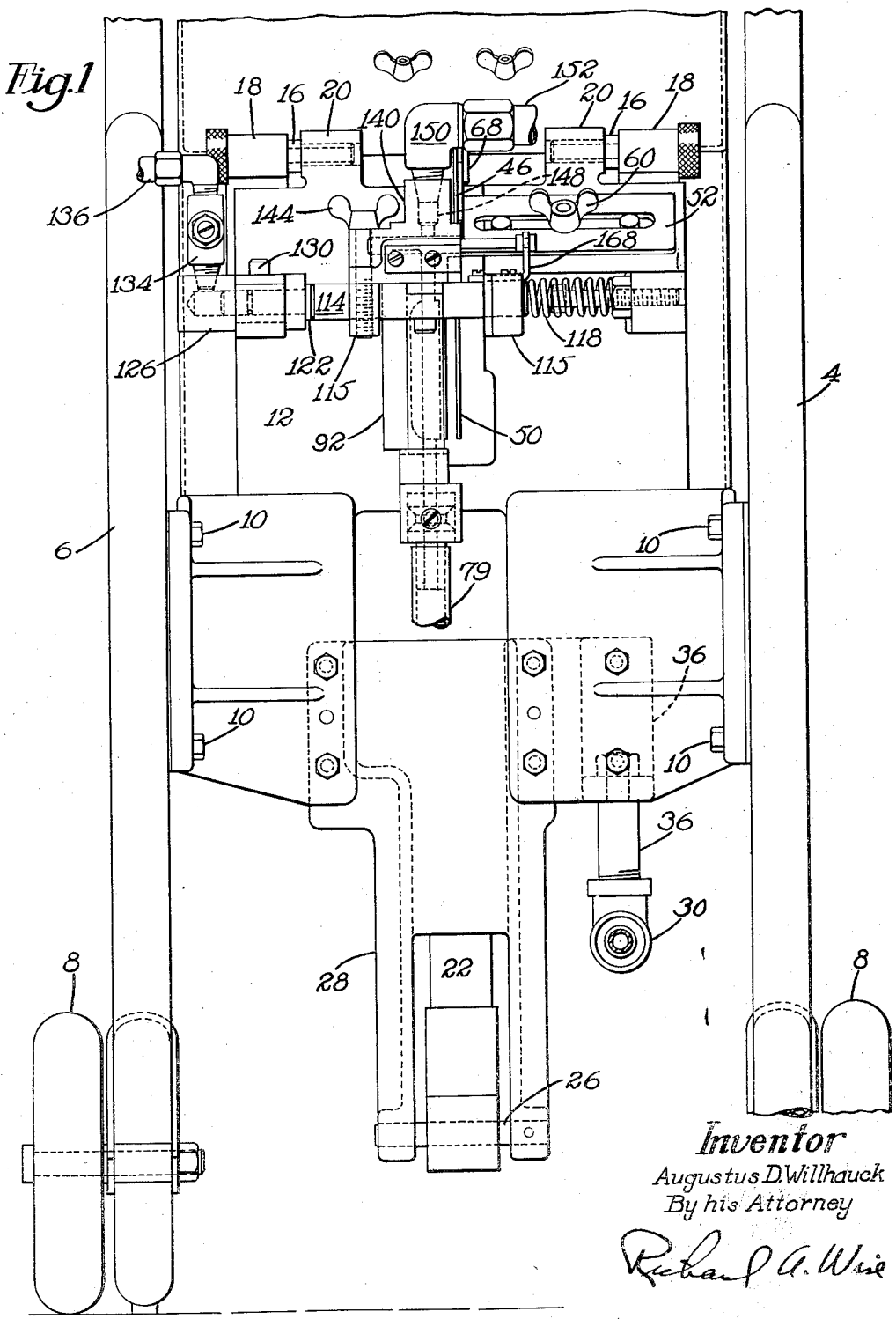

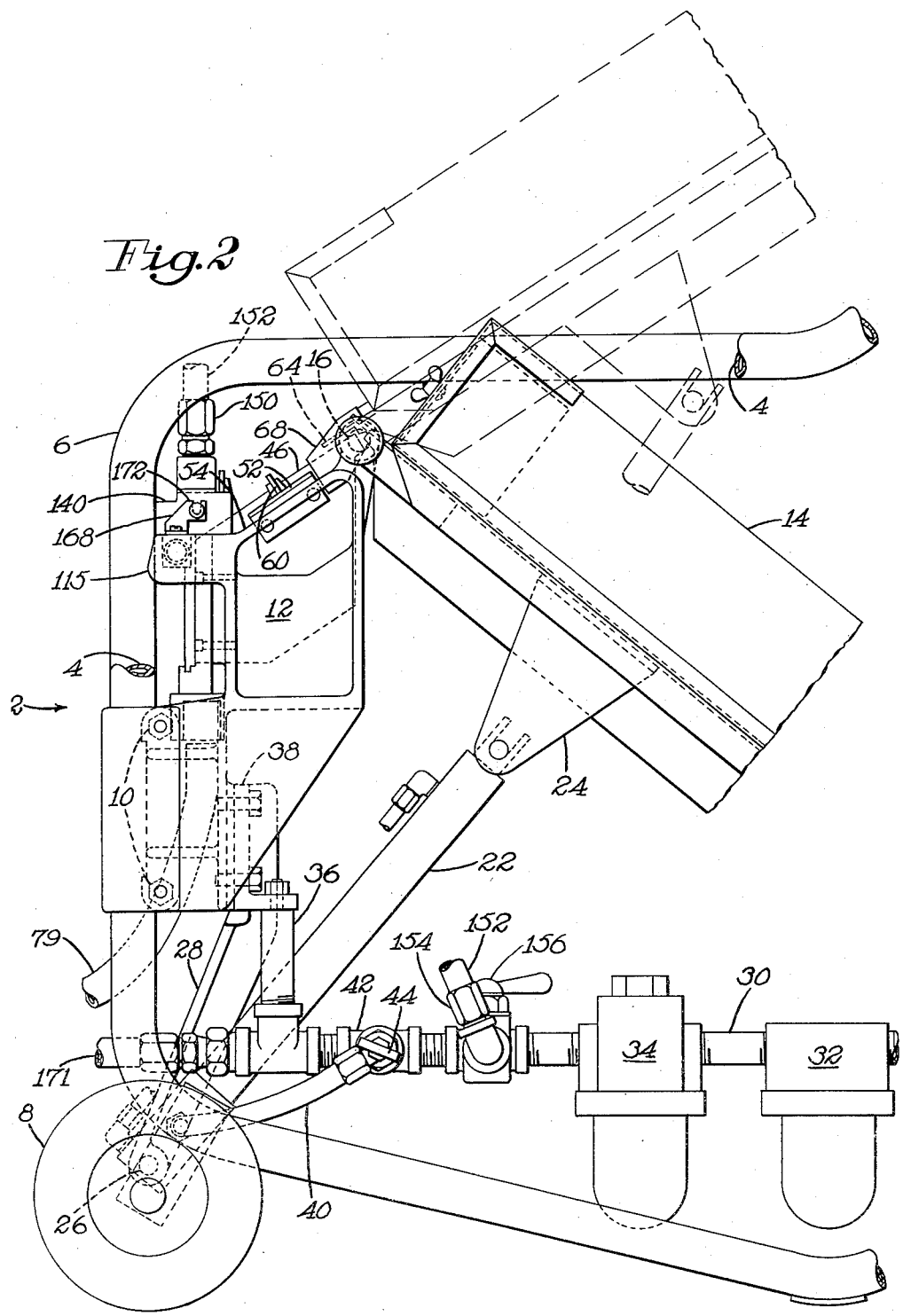

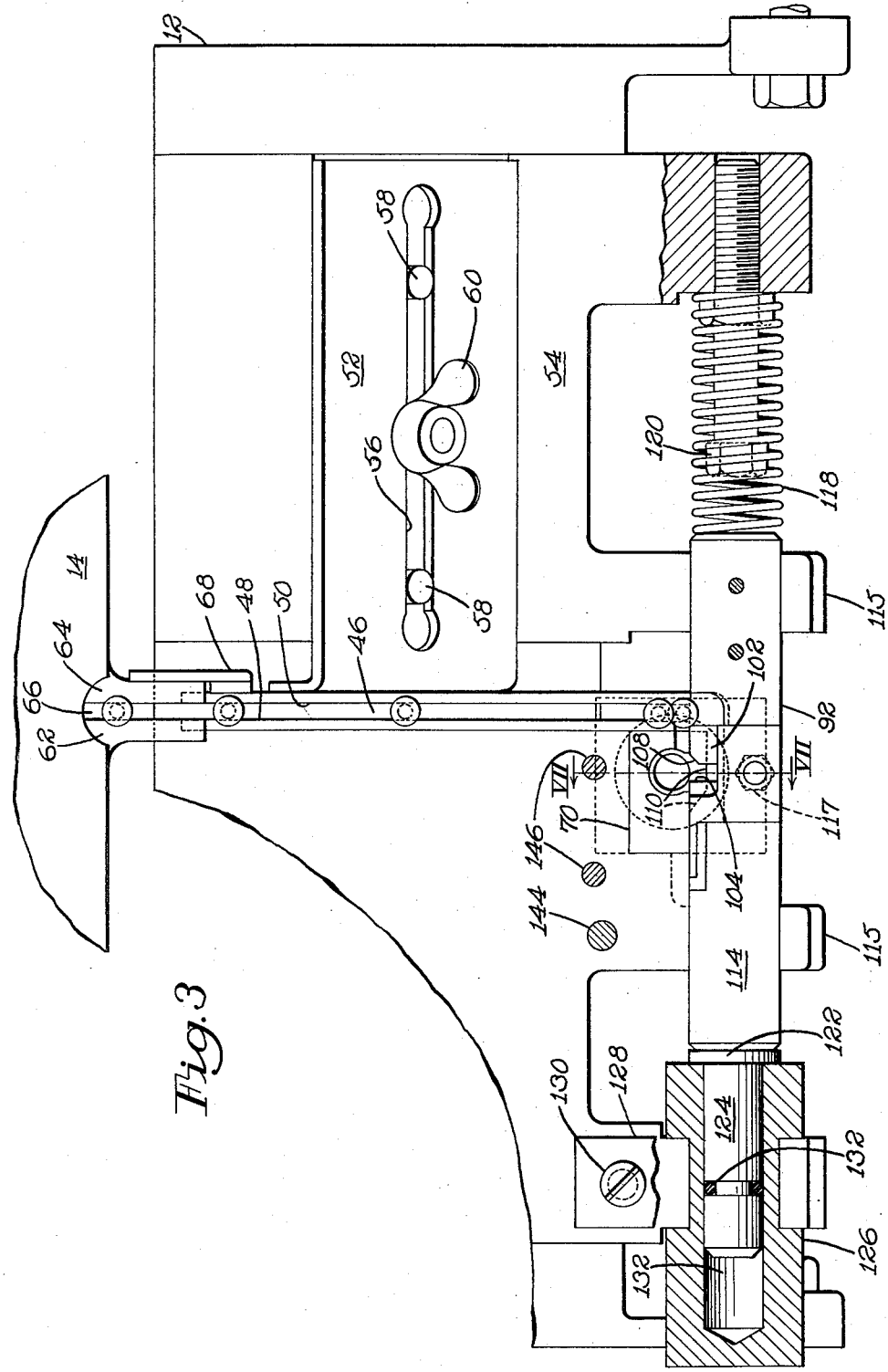

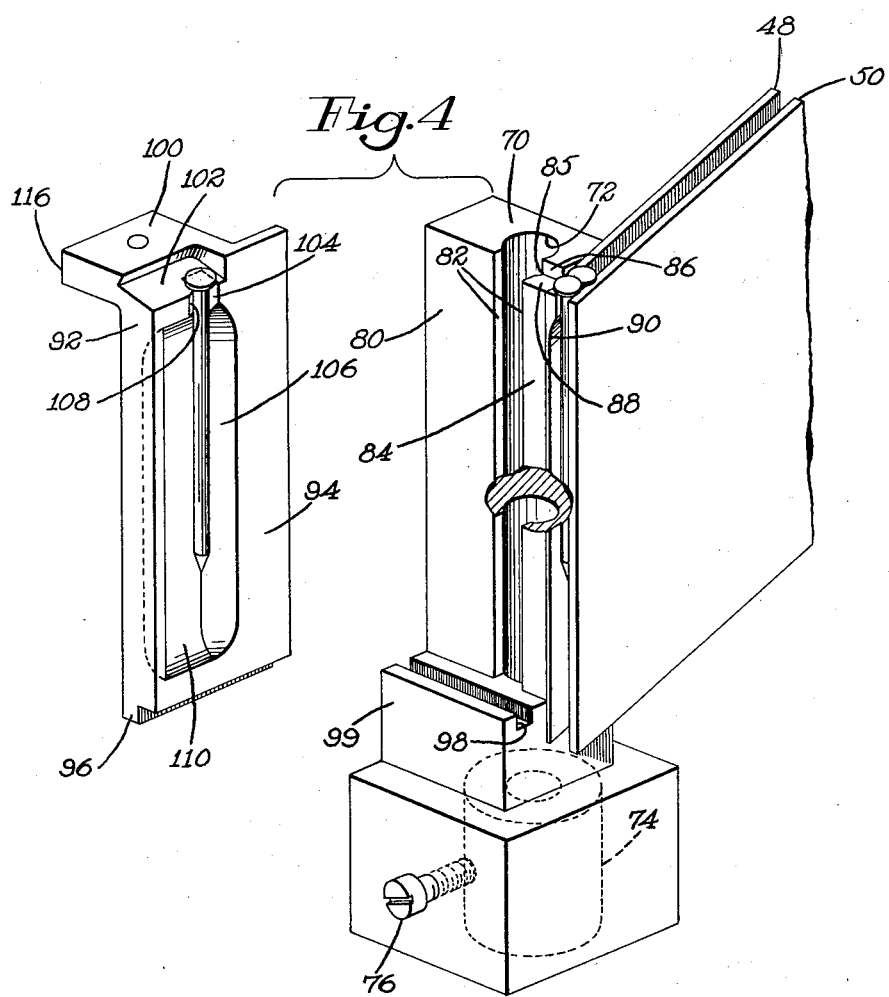

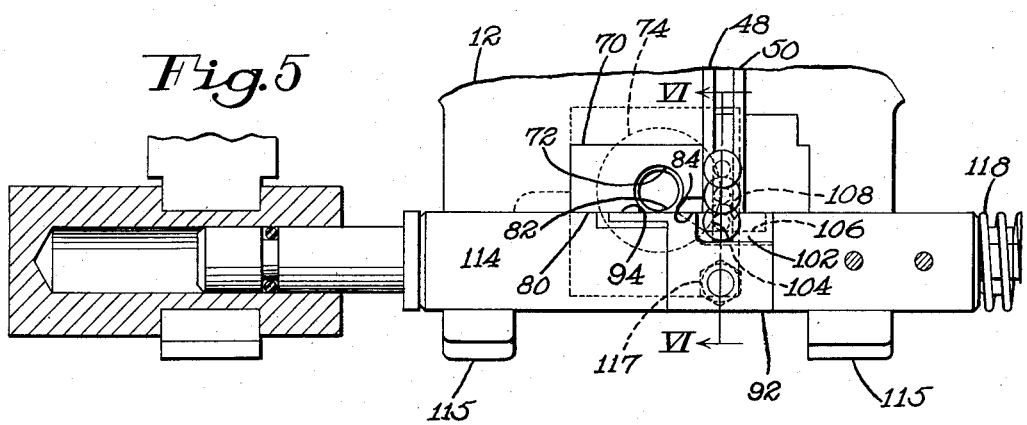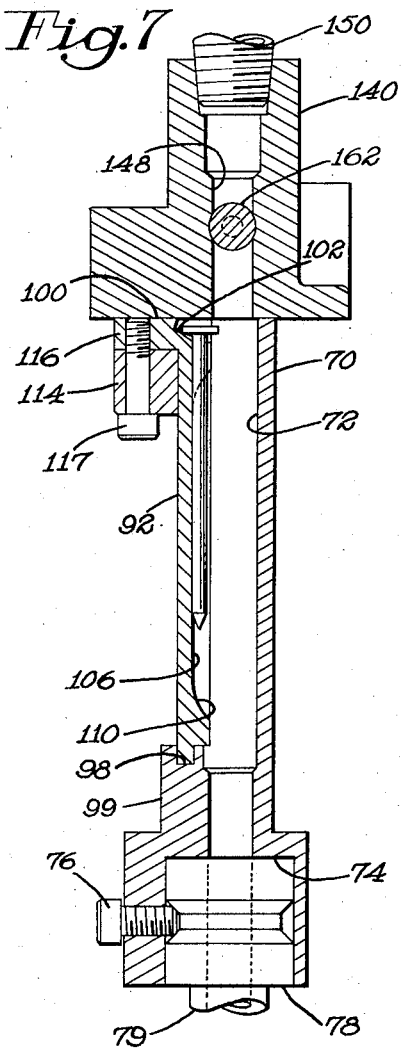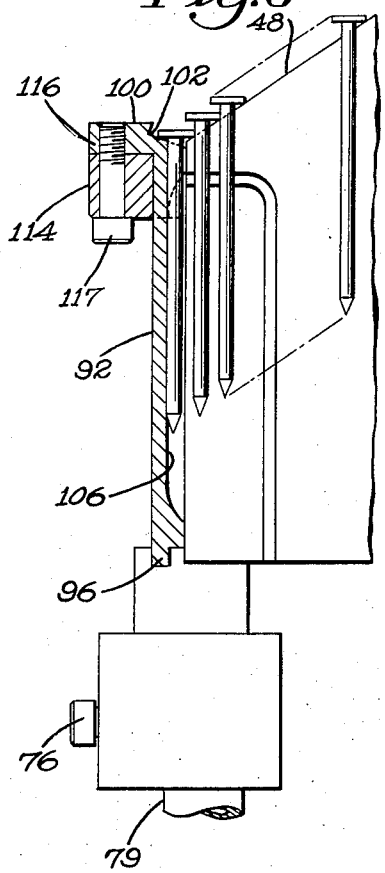

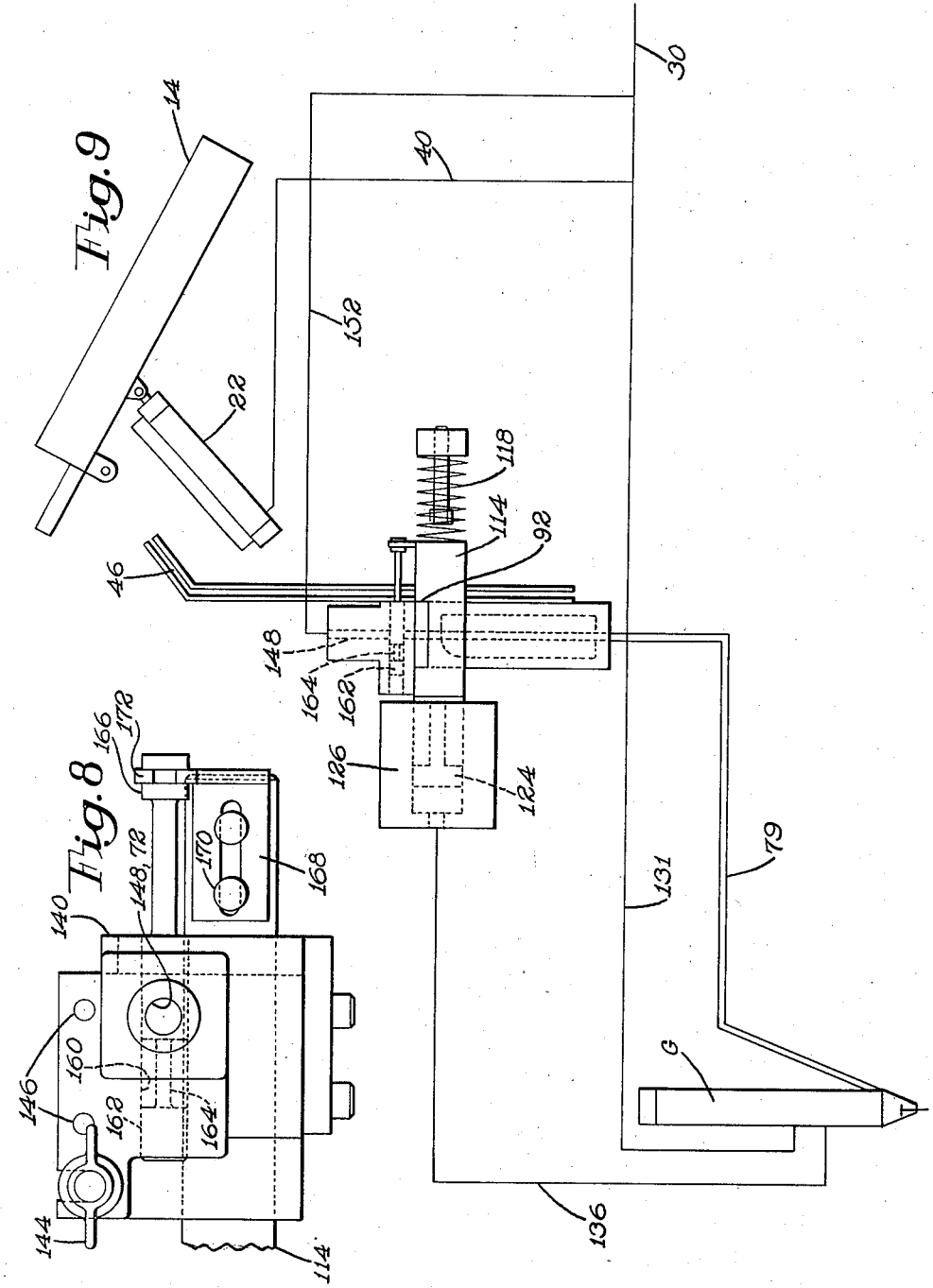

2,982,965

FASTENER HANDLING MECHANISMS

Augustus D. Willhauck, Stoneham, Mass., assignor to United Shoe Machinery Corporation, Flemington, N.J., a corporation of New Jersey Filed Sept. 18, 1958, Ser. No. 761,719

4 Claims. (Cl. 1—6)

This invention relates to fastener handling and more particularly to manually operated, automatic-feed devices for inserting fasteners, such as nails and tacks, etc. Many such devices comprise a portable driving tool connected to a remotely located feeding mechanism which automatically separates, orients and propels fasteners one at a time through a conduit to the tool upon receipt of a signal emanating from the tool.

The more common portable fastener driving tools may be classified in two general categories, (1) those in which the actual driving operation is substantially instantaneous, for example, a single-blow nail or tack driver, and (2) those in which the driving operation requires a somewhat longer or sustained period of time, for example, multiple-blow nail drivers and rotary screw drivers. Feeding mechanisms used with a tool in the second category, i.e., those having longer or sustained driving periods, require means for delaying the feeding or delivery of a subsequent fastener until the driving operation at the tool ceases, otherwise a jam will occur. However, with a tool of the first category, i.e. those having substantially instantaneous driving periods, the feeding mechanism may be actuated to deliver the next fastener as soon as the tool is fired, since the driving period is sufficiently short so as to be completed before the next fastener can be propelled through the delivery conduit, thereby substantially eliminating the possibility of a jam caused by more than one fastener being in the tool at the same time.

In a copending application for United States Letters Patent Serial No. 578,272, filed April 16, 1956, now Patent No. 2,879,509, issued March 31, 1959, in the name of George L. Congdon et al., there is disclosed a fastener handling device having feeding mechanism adapted for supplying fasteners to portable tools of the second category, i.e., to multiple-blow nail drivers.

An object of the present invention is to adapt a feeding mechanism of the type disclosed in the Congdon et al. application for feeding fasteners to tools of the first category, i.e. tools having substantially instantaneous driving periods, such as the single blow nail driver disclosed in United States Letters Patent No. 2,802,451, granted on August 13, 1957, upon an application of Fred F. Chellis et al.

Another object of this invention is to provide a fastener handling and feeding mechanism of the above-described type which is simply constructed and easily assembled.

Still another object is to provide a fastener handling and feeding mechanism which is capable of handling different size fasteners with a minimum of adjustment required.

In accordance with these objects and as a feature of this invention there is provided a fastener handling machine having an inclined raceway for slidably supporting a plurality of fasteners with their heads uniformly oriented with respect to each other. Fasteners are supplied to the upper end of the raceway from a supply hopper and pass down the raceway to its lower end from which they are picked one at a time and delivered to a conduit which conducts them to an inserting tool. Means for picking the fasteners from the raceway comprises a carrier bar which mounts a picker plate for reciprocating movement. The plate is constructed to handle a predetermined range of sizes of fatseners and is removably secured to the carrier bar in order that it may be replaced with other plates for handling additional sizes of fasteners. Located adjacent the lower end of the raceway is a block provided with a bore leading to the delivery conduit. A surface on the block intersects the bore forming a slot opening into the bore. The picker plates slide on this surface. Each plate is formed with an inclined shelf engageable with the undersurface of the head of a fastener and a notch in the shelf for accommodating the shank of the fastener immediately below its head. A cavity in the face of the plate below the notch accommodates the remaining portion of the shank and a cam surface in the cavity inclined toward the slot assists fasteners in entering the slot as they fall from the shelf. Appropriate camming means are provided to assist the fastener in its initial entry into the picker notch. Upon the firing of the portable inserting tool, pneumatically operated means are actuated to reciprocate the picker plate from a normal or fastener discharging position wherein the notch is aligned with the slot in the block to a picking position wherein its notch becomes aligned with the raceway to receive the endmost fastener.

Operated in timed sequence with the picker movement are means for propelling fasteners through the conduit comprising a pressurized air passageway leading to the conduit with a valve in the passageway movable with the picker plate for closing the pasasgeway when the picker is in fastener discharging position and for opening the passageway to permit compressed air to flow into the conduit when the picker is in fastener picking position whereby when one fastener is being picked the previously picked and released fastener is propelled through the conduit.

The above and other features of the invention including various novel details of construction and combinations of parts will now be more particularly described with reference to the accompanying drawings and pointed out in the claims.

In the drawings:

Fig. 1 is a front elevation of a machine embodying the invention;

Fig. 2 is a side elevation of the machine shown in Fig. 1;

Fig. 3 is a plan view on an enlarged scale, partly in section, of the picking mechanism in fastener discharging position;

Fig. 4 is an exploded detail view of portions of the fastener picking mechanism shown in perspective;

Fig. 5 is a plan view similar to Fig. 3 with the picker in fastener picking position;

Fig. 6 is a sectional view taken on the line VI—VI of Fig. 5;

Fig. 7 is a sectional view taken on the line VII—VII of Fig. 3;

Fig. 8 is a detailed plan view of a portion of the pneumatic control mechanism employed in the machine; and Fig. 9 is a diagrammatical view of the operating instrumentalities of the machine and including the pneumatic circuit.

Referring to Figs. 1 and 2, the illustrative machine utilizes a skeleton supporting frame 2 comprising two tubular side frame members 4 and 6, preferably constructed of steel tubing or pipe for strength and lightness. A pair of wheels 8 are journaled on the side frame members to facilitate moving the machine from place to place. Secured by screws 10 between the frame members is a main body member 12 on which the principal operating mechanisms are mounted. A fastener containing hopper 14 is pivotally mounted on the upper portion of the body 12 on a pair of trunnions 16 fitted in bosses 18 on the hopper and pivotally received in aligned bosses 20 on the body. The hopper is pivoted about the axis of the trunnions 16 between the solid and dotted line positions as shown in Fig. 2 by an air motor 22. One end of the air motor is pivotally attached to a bracket 24 depending from the hopper and the opposite end is pivotally supported on a stud 26 fitted in a bracket 28 secured to the main body member 12. The hopper 14 and its operating motor 22 are identical with those disclosed in the above-identified Congdon et al. application.

Compressed air is directed to the machine from any convenient source through a supply pipe 30 passing through a filter 32 and an oiler 34. The pipe 30 is suspended by an extension pipe 36 from a bracket 38 on the body 12. A flexible tube 40 and a T fitting 42, having a conventional flow-adjusting valve 44, connect the air motor 22 to the supply pipe 30.

Fasteners are delivered to a downwardly extending raceway 46 which comprises a pair of spaced plates 48 and 50, seen best in Fig. 3. The plate 48 is fixed to the body 12 and the plate 50 is adjustable in parallel relationship toward and away from the plate 48, to accommodate different sizes of fasteners. The movable plate 50 is secured to an adjusting bracket 52 slidable on an upper inclined surface 54 of the body 12, the walls of a slot 56 in the bracket 52 engaging pins 58 projecting from the body 12 to assure parallel alignment of the raceway plates 48 and 50. The bracket 52 is clamped in the desired position of adjustment by a wing nut 60 in the conventional manner.

The spacing of the raceway plates is identical with the spacing of a pair of corresponding plates 62, 64 which form between them a slot in the bottom of the hopper 14, the plate 62 being fixed and the plate 64 being spring-biased away from it. A finger 68 on the movable raceway plate 50 engages the movable hopper plate 64 to assure proper adjustment, as explained in the above-identified Congdon et al. application. The hopper, and consequently the nails contained therein in random orientation, are continuously agitated, whereby their shanks eventually drop into the slot 66 in order that they may pass onto the raceway. They slide downwardly of the raceway suspended by their heads with their shanks depending between the raceway plates.

Upon reaching the lower end of the raceway they are separated from the raceway one at a time by means now to be described and are conveyed to a remotely located fastening inserting tool upon the receipt of a signal emanating from the tool.

A block 70 (see particularly Figs. 4 and 5) is fitted in the front of the body 12 adjacent the stationary raceway plate 48. A bore 72 extends downwardly through the block terminating in an enlarged counterbore 74 in which there is removably secured by a screw 76 (Fig. 7) a coupling 78 attached to the upper end of a fastener delivery conduit or tube 79. A flat vertical surface 80 formed on the block 70 intersects a portion of the bore 72 thereby forming a slot 82 in what would otherwise be the forward wall of the bore 72.

To the right of the slot 82, as viewed in Fig. 4, the vertical surface is designated as surface 84 and, as seen in Fig. 5, is co-planar with that portion designated as surface 80. Formed at the upper edge of the surface 84 is a notch 85 having a vertical surface 86 and a horizontal surface 88. The stationary raceway plate 48 is relieved below its upper surface as indicated at 90 (Fig. 6) to provide a camming surface to assist in the separation of inadvertently misaligned nails from the raceway by means next to be described. This applies particularly to nails whose heads extend more nearly parallel with the upper surface of the raceway than those shown in Fig. 6 which are properly aligned.

The endmost nail is picked from the raceway and transported to the bore 72 by a picker plate 92. The plate has a vertical surface 94 which, when assembled with the block 70, as seen in Figs. 3 and 5, engages surfaces 80 and 84 of the block. A rib 96 on the bottom of the plate is guided by a slot 98 formed in a boss 99 on the lower portion of the block 70. Spaced slightly below the upper surface 100 of the picker plate 92 is a shelf 102 which is inclined downwardly toward the block 70 as seen in Figs. 6 and 7. A notch 104 whose dimensions are slightly larger than the shank of a nail to be picked but smaller than its head, is formed in the picker plate between the shelf 102 and a cavity 106. A relief angle or beveled camming surface 108 is formed at the right-hand edge of the notch 104 when viewed as in Figs. 3 and 5.

The picker plate 92 is reciprocated relatively to the raceway 46 and the bore 72 between a picking position shown in Figs. 5 and 6 wherein the notch 104 is in alignment with the raceway and a discharging position shown in Figs. 3 and 7 whereby the notch is in alignment with the slot or opening 82 communicating with the bore 72. When the notch is aligned with the raceway the endmost fastener therein slides from the raceway into the notch, its head being supported principally by the inclined shelf 102 and partially by the raceway, as shown in Fig. 6, and the remainder of its shank lying within the cavity 106. When the picker plate begins to move to the left, that portion of the head of the nail which was supported by the raceway plate 48 moves onto the horizontal surface 86 of the notch 85 in the block 70. The nail would normally slide downwardly off the shelf 102 but is prevented from doing so by the vertical surface 84 of the block 70 which engages the shank. However, when the notch 104 in the picker plate becomes aligned with the slot 82 communicating with the bore 72, the nail is free to slide completely off the shelf and into the bore 72. The nail is assisted into the bore by the lower curved portion 110 of the cavity 106 which is formed as a camming surface, as seen in Fig. 7. From the bore 72 the nail drops into the delivery conduit 79 ready to be conveyed to the inserting tool during the next cycle. The picker plate is returned to the right and the next nail in the raceway is received within the notch 104, it being assisted in its entry by the beveled camming surface 108.

Means for reciprocating the picker plate 92 includes a carrier bar 114 (Figs. 5 and 8) mounted for sliding movement in guides 115 projecting from the front of the body 12. An upper forwardly extending portion 116 of the picker plate is removably secured within a recess in the carrier bar 114 by a screw 117, the remainder of the plate depending from the bar with its bottom being guided within the slot 98 as seen in Fig. 7. While the picker plate may handle one or a range of nails, as for example 8d through 10d, the total range of sizes that the machine may handle is increased by providing additional picker plates having larger and/or smaller notches 104. The plates are interchangeable in the carrier bar 114 merely by removal of the screw 117. Accompanying a change in picker plate size will be a change in raceway adjustment.

A compression spring 118 engages the right-hand end of the carrier bar 114 to urge the bar to the left. The spring 118 surrounds an adjustable stop screw 120 which limits the extent of movement of the bar 114 to the right. Engageable with the left-hand end of the bar 114 is the head 122 of a piston 124 slidable in a cylinder 126. The cylinder 126 is mounted in a bracket 128 held in place on the body 12 by a screw 130. An O ring 132 in the piston forms an airtight seal with the walls of the cylinder 126.

Communicating with the left-hand end of the interior of the cylinder 126 is an adjustable air inlet fitting 134 (Fig. 1) connected by an elbow to an air delivery tube 136. The tube 136 is the signal tube leading from the fastener-inserting gun which becomes pressurized, in known manner, when the gun is fired. When the line 136 becomes pressurized the piston 124 moves to the right, consequently moving the bar 114 and the picker plate 92 against the force of the compression spring 118. When the cylinder 126 becomes depressurized the spring 118 returns the bar, picker plate and piston to the left.

Fasteners are conveyed to the inserting gun through the tube 79 by compressed air which enters the tube in timed sequence with the operation of the picker plate 92 by means now to be described. A block 140 of irregular configuration (Figs. 1, 7 and 8) is mounted above the block 70 overlying the upper portion 116 of the picker plate 92 in the mid portion of the bar 114. The block 140 is secured to the body 12 by a wing bolt 144 and a pair of pins 146 extending upwardly out of the body. A passageway 148 extends through the block 140 in vertical alignment with the bore 72 in the block 70. An air inlet fitting 150 places the passageway 148 in communication with a line 152 which is connected to the main air supply line 30 by a fitting 154 (Fig. 2). A manually controlled valve 156 regulates the air passing through the line 152. Extending lengthwise through the block 140 (Fig. 8) and intersecting the passageway 148 is a bore 160. A piston 162 having a necked area or reduced portion 164 intermediate its ends is slidable in the bore 160. A piston rod extends out of the right-hand side of the bore 160 and terminates in an annularly grooved hub 166. An L-shaped bracket 168 is adjustably secured by a slot and screw connection 170 to the reciprocating bar 114 and has an upstanding forked arm 172 fitting within the groove of the hub 166. By this construction reciprocating motion of the bar 114 is transmitted to the piston 162. When the bar is urged to the right and the picker plate 92 is in the picking position (Figs. 5 and 6) the necked area 164 of the piston 162 is in alignment with the passageway 148 permitting pressurized air in the line 152 to pass into the tube 79. Conversely, when the bar 114 is returned to the left and the picker plate is in the fastener delivering position (Figs. 3, 7 and 8), the passageway 148 is blocked by the piston 162.

A complete cycle of the machine in delivering a fastener to the inserting gun occurs in the following manner. Referring to the diagrammatic showing of Fig. 9, fasteners are fed to the raceway 46 from the hopper 14 which is continuously oscillated by the air motor 22. At the beginning of the cycle one fastener is in the gun ready to be driven and a second fastener is located in the delivery tube between the feeding mechanism and the gun, probably resting at a bend. These fasteners may be placed in the gun and tube by hand or deposited there during previous operating cycles. The picker plate 92 is in its left-hand or discharge position under the influence of the spring 118 and the passageway 148 blocked by the piston 162, the signal line 136 and the cylinder 126 being at atmospheric pressure. When the gun is fired to drive the first fastener, the signal line 136 becomes pressurized in a known manner as explained in the above-identified Chellis et al. patent, causing the piston 124 to move the picker plate 92 to the right to pick a third fastener, which is the fastener then lowermost in the raceway 46. At this time the necked area 164 of the piston 162 becomes aligned with the passageway 148 permitting the pressurized air in the line 152 to pass into the tube 79 to convey the second fastener, i.e., the one resting in the tube, to the gun. When the gun is de-triggered, the signal line 136 becomes depressurized and the spring 118 returns the picker plate 92 to its left-hand position whereby the third or then picked fastener is carried by the picker plate to the tube 79 into which it falls coming to rest at a bend ready to be propelled to the gun during the next operating cycle.

If it is desired to drive fasteners of a different size, the picker plate 92 is disengaged from the bar 114 simply by removing the screw 117 and replaced by a similar plate having a notch of sufficient size to accommodate the desired fastener. Accompanying this replacement will be a change in raceway adjustment, with no additional changes being required.

Having thus described my invention, what I claim as new and desire to secure by Letters Patent of the United States is:

1. In a fastener handling machine, a downwardly inclined raceway for supporting a plurality of fasteners by their heads with their shanks depending therefrom, a delivery conduit laterally displaced from the end of the raceway, means for transferring fasteners one at a time from the raceway to the conduit comprising a block adjacent the raceway and having a bore communicating with the conduit, a substantially vertical surface on the block contiguous with the end of the raceway and intersecting the bore thereby forming a slot opening into said bore, a picker plate having a vertical surface directly engageable with and slidable on the vertical surface of the block and a substantially horizontal upper surface normal thereto, a shelf formed in the upper surface and inclined downwardly from the horizontal and toward the slot for supporting the head of a fastener, a notch in the shelf for accommodating the upper portion of the shank of the fastener, and means to reciprocate the picker plate between a picking position wherein its notch is aligned with the raceway to receive the endmost fastener with its head on the shelf, and a discharging portion wherein the notch is aligned with the slot in the block permitting the fastener to slide down the inclined shelf into the bore.

2. In a fastener handling machine, a downwardly inclined raceway for supporting a plurality of fasteners by their heads with their shanks depending therefrom, a delivery conduit laterally displaced from the end of the raceway, means for transferring fasteners one at a time from the raceway to the conduit comprising a block adjacent the raceway and having a bore communicating with the conduit, a substantially vertical surface on the block contiguous with the end of the raceway and intersecting the bore thereby forming a slot opening into said bore, a picker plate having a vertical surface directly engageable with and slidable on the vertical surface of the block and a substantially horizontal upper surface normal thereto, a shelf formed in the upper surface and inclined downwardly from the horizontal and toward the slot for supporting the head of a fastener, a notch in the shelf for accommodating the upper portion of the shank of the fastener, a cavity in the vertical surface of the plate below the notch and communicating therewith, said cavity having a depth at least equal to the shank diameter of the fastener to completely receive the shank of the fastener below the portion accommodated by the notch, the lateral dimension of said cavity being greater than the shank diameter of the fastener, a cam surface at the lower end of the cavity inclined downwardly and toward the slot to assist fasteners in entering said slot as their heads slide down the inclined shelf, and means to reciprocate the plate between a picking position wherein the notch is aligned with the raceway to receive the endmost fastener, and a discharging position wherein the notch is aligned with the slot in the block permitting the fastener to slide down the inclined shelf into the bore.

3. In a fastener handling machine, a downwardly inclined raceway for supporting a plurality of fasteners by their heads with their shanks depending therefrom, a delivery conduit laterally displaced from the end of the raceway, means for transferring fasteners one at a time from the raceway to the conduit comprising a block adjacent the raceway and having a bore communicating with the conduit, a substantially vertical surface on the block contiguous with the end of the raceway and intersecting the bore thereby forming a slot opening into said bore, a picker plate having a vertical surface directly engageable with and slidable on the vertical surface of the block and a substantially horizontal upper surface normal thereto, a shelf formed in the upper surface and inclined downwardly from the horizontal and toward the slot for supporting the head of a fastener, a notch in the shelf for accommodating the upper portion of the shank of the fastener, means to reciprocate the plate between a picking position wherein the notch is aligned with the raceway to receive the endmost fastener and a discharging position wherein the notch is aligned with the slot to discharge the fastener into the bore, a first vertical camming surface on the plate adjacent the notch formed obliquely with said vertical surface to facilitate entry of a fastener into the notch as it becomes aligned with the raceway, a second camming surface on the plate below the notch to assist the entry of a fastener into the bore as it becomes aligned with the bore, and a notch formed in said block between the end of the raceway and the bore below the upper surface of the picker plate to accommodate the head of the fastener as it is carried by the picker into the bore.

4. In a fastener handling machine, a downwardly inclined raceway for supporting a plurality of fasteners by their heads with their shanks depending therefrom, a delivery conduit laterally displaced from the end of the raceway, means for transferring fasteners one at a time from the raceway to the conduit comprising a block adjacent the raceway and having a bore communicating with the conduit, a substantially vertical surface on the block contiguous with the end of the raceway and intersecting the bore thereby forming a slot opening into said bore, a picker plate having a vertical surface directly engageable with and slidable on the vertical surface of the block and a substantially horizontal upper surface normal thereto, a shelf formed in the picker plate below the upper surface and inclined downwardly from the horizontal and toward the slot for supporting the head of a fastener, a notch in the shelf for accommodating the upper portion of the shank of the fastener, a carrier bar mounting the picker plate for reciprocation in a horizontal linear path, said carrier bar having a recess for receiving the picker plate with said upper surface flush with said bar, means for reciprocating said bar and plate between a picking position wherein the notch is aligned with the raceway to receive the endmost fastener, and a discharging position wherein the notch is aligned with the slot in the block permitting the fastener to slide down the inclined shelf into the bore, means for propelling fasteners through the conduit comprising a block secured to said first-mentioned block and overlying the upper surface of the picker plate and the carrier bar, a pressurized air passageway in the second-mentioned block located directly above said bore, a slide valve in the second-mentioned block movable parallel with the carrier bar, and an adjustable link connecting one end of the slide valve to the carrier bar for moving the valve in timed sequence with the picker plate for closing the passageway when the picker is in fastener discharging position and for opening the passageway to permit compressed air to flow into the conduit when the picker is in the fastener picking position to propel the previously discharged fastener through the conduit.

References Cited in the file of this patent

UNITED STATES PATENTS

| | | |
|---|---|---|
| 1,263,794 | Neff | Apr. 23, 1918 |
| 1,703,458 | Ruff | Feb. 26, 1929 |
| 2,822,543 | De La Garrigue | Feb. 11, 1958 |
| 2,887,685 | Cast | May 26, 1959 |